Sept. 10, 1968      J. L. BROWN      3,400,954
PIPE COUPLING
Filed Jan. 31, 1967
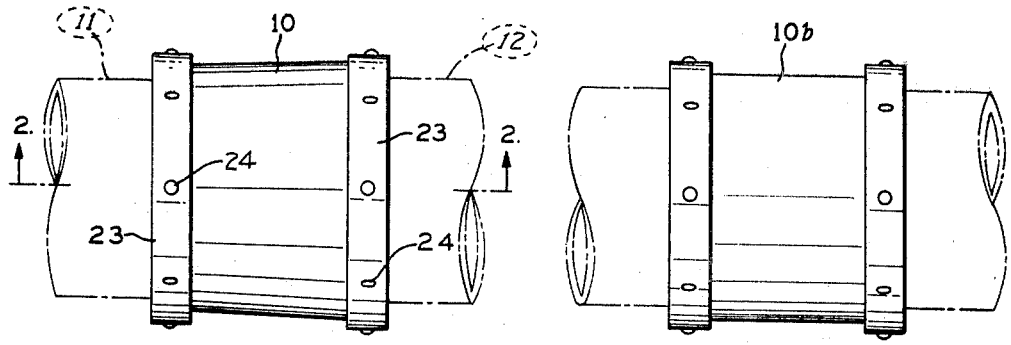
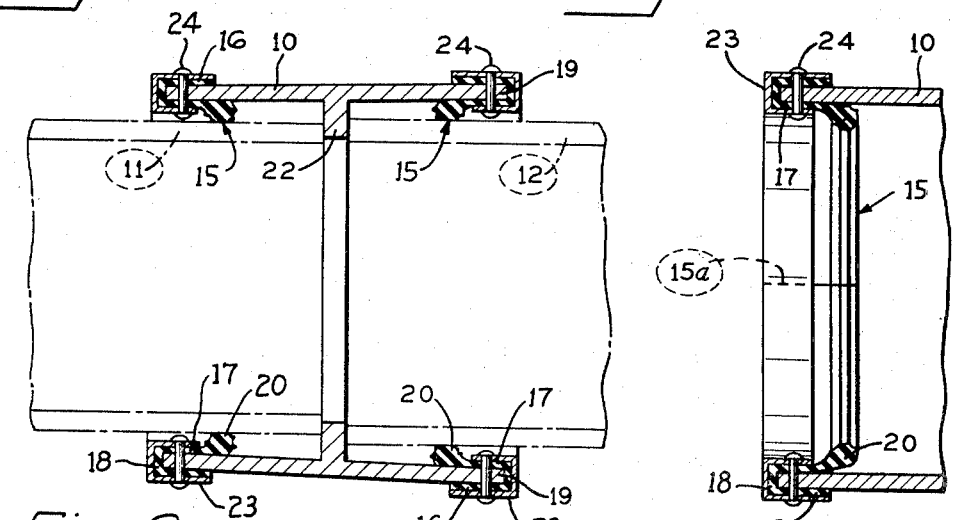
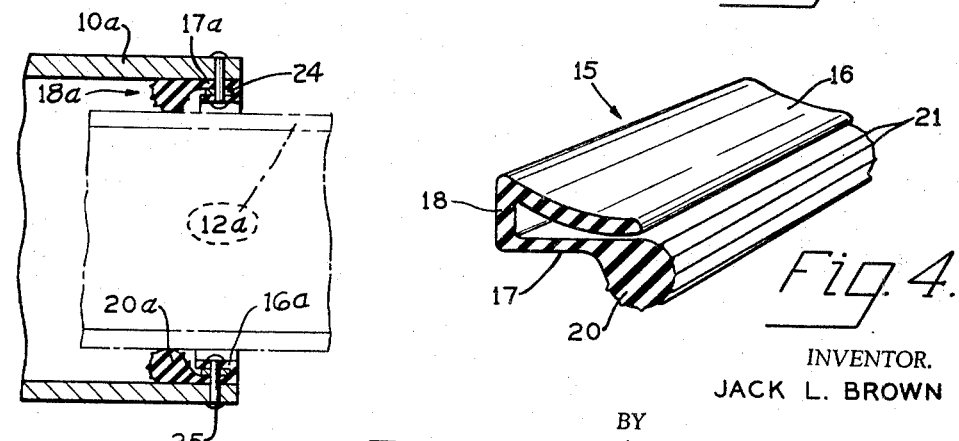
INVENTOR.
JACK L. BROWN
BY Meyer, Tilberry & Body
ATTORNEYS.

ns patent office 3,400,954
Patented Sept. 10, 1968

3,400,954
PIPE COUPLING
Jack L. Brown, 22149 Douglas Road,
Shaker Heights, Ohio 44122
Filed Jan. 31, 1967, Ser. No. 613,041
1 Claim. (Cl. 285—110)

ABSTRACT OF THE DISCLOSURE

A pipe coupling for connecting two pipes in fluid tight relationship in which a body member has a sealing gasket at either end. Each gasket has an axially inwardly extending circumferentially continuous pipe receiving flange which terminates at its inner end in an annular enlarged bead for sealing engagement with a pipe end. An annular cap member is telescopically clamped onto the gasket and encloses the flange to secure the gasket to the body member.

This invention relates to pipe couplings and more particularly, to a pipe coupling for connecting in fluid tight relationship two pipes whose axially aligned end portions extend into said coupling.

The present invention relates to a pipe coupling for receiving and retaining in fluid tight relationship the axially aligned end portions of two pipes, such as clay pipes, metal pipes, concrete pipes and the like. The coupling comprises a tubular flexible body member provided at each end thereof with an annular gasket having an axially inwardly extending circumferentially continuous pipe-receiving flange which terminates at is inner end in an annular enlarged bead for sealing engagement with a pipe end portion to provide at each end of the coupling an effective fluid tight connection of the pipe end portion inserted therein. An annular cap member is received over the flange to provide protection for the gasket and to secure the gasket of the body member.

The present invention has for its primary object the provision of a pipe coupling which is characterized by its structural simplicity, the economy of its manufacture, the ease with which it may be applied to two pipe end portions which are substantially axially aligned for the connection thereof, and above all, the fluid tight manner in which such connection is effected.

A further and more specific object of the present invention is the provision of a coupling for pipe end portions which are of plain tubular form and which may be slightly out of round and/or of somewhat tapered form.

A further more specific object of the present invention is the provision of a pipe coupling having a flexible but non-expandable body member of simple tubular form having resilient gaskets suitably mounted on the ends thereof and provided within said body member with circumferentially continuous flanges of yieldable form for the reception of the pipe end portions to be connected, and which gasket flanges have enlarged resilient end beads of annular form for sealing or fluid tight engagement with said pipe end portions. As such gasket flanges are of flexible form and as the sealing beads thereof are of resilient character, they readily conform to variations in the diameters of said pipe end portions and to irregularities in the outer surfaces thereof. As a result, a particularly effective seal or fluid tight relationship is provided between the coupling and the pipe end portions connected thereby, as will be readily understood.

A further more specific object of the present invention is the provision of a pipe coupling in which the end sealing gaskets thereof are provided with retaining cover members, of generally cup shape in cross section and of metal, plastic or the like, which are telescopically mounted on said gaskets for the retention thereof on the tubular body member of the pipe coupling. If desired and as here shown, the coupling cover members and the portions of the gaskets enclosed thereby are riveted, pinned or otherwise secured to the coupling body member to effectively maintain said gaskets in assembly with said coupling body member, even in the use of the present pipe couplings in high pressure lines.

Further objects of the present invention, and certain of its practical advantages, will be referred to in or will be evident from the following description of two embodiments of the invention, as illustrated in the accompanying drawing in which:

FIG. 1 is a side elevational view of a pipe coupling of longitudinally tapered form embodying the present invention, the axially aligned pipe end portions connected by said coupling being shown in dot-dash lines;

FIG. 2 is a longitudinal sectional view of the coupling of FIG. 1, the view being on the line 2—2 of FIG. 1 and on an enlarged scale;

FIG. 3 is a longitudinal sectional view, on the scale of FIG. 2, of one end portion of the pipe coupling of FIG. 1 before the insertion therein of a pipe end portion, the sealing flange of such coupling for such pipe end portion being in the relaxed, hung or floating position which it occupies before the insertion of said pipe end portion;

FIG. 4 is a fragmentary perspective view of one of the end sealing gaskets of the coupling of FIG. 1, the view being on a somewhat larger scale;

FIG. 5 is a longitudinal sectional view of one end portion of a pipe coupling embodying a modified form of the present invention, the sealing gasket of said end portion of the coupling body member being located entirely within said end portion, and an annular reinforcing band being provided for said gasket, the gasket and its reinforcing band being riveted, pinned or otherwise suitably secured to said body end portion; and FIG. 6 is a view similar to FIG. 1, with the pipe coupling thereof differing from the pipe coupling of FIG. 1 only in that the tubular body member thereof is of cylindrical form.

Before specifically describing the pipe couplings here illustrated for the disclosure of the present invention, it is to be understood that the present invention is not limited to such illustrated embodiments, as pipe couplings embodying the present invention may take various other forms. It also is to be understood that the terminology and the phraseology herein used are for purposes of description and not of limitation, as the scope of the present invention is denoted by the appended claims.

Referring first to that embodiment of the invention illustrated in FIGS. 1 to 4, it will be noted that the pipe coupling constituting such embodiment comprises a tubular body member 10 for the reception, in fluid tight relationship, of the axially aligned end portions 11 and 12 of two pipes to be connected by such coupling. As will be readily understood, such pipes may be of any suitable material, such as metal, clay, concrete or the like, and of any suitable diametral size, the coupling used therewith being, of course, of a diametral size to receive and sealingly retain the end portions of such pipes.

The coupling body member 10 is of flexible but non-expandable character and of any suitable material, such as rubber or the like. Because of the flexible nature of the coupling body member, axial deviations in the pipe line in which is used couplings embodying the present invention are of no consequence. As a result, substantial line movement can occur without liability of leakage and the like. Preferably and as here shown, the coupling body member is of simple tubular form, so that it can be economically made by a molding or extrusion operation, and may be of any desired length. As heretofore indicated, its diameter will depend, of course, upon the diameter of the pipe end portions which it is to receive in use thereof. In the kiln drying of certain kinds of pipe, such as clay pipe, a variation occurs in the degree of shrinkage of the pipe end portions, with consequent variation in the diameters of such end portions, say from one-eighth (⅛) to one-half (½) of an inch. If desired, therefore, the tubular body members 10 of pipe couplings embodying the present invention may be of longitudinally tapered form, as in this embodiment of the invention of FIGS. 1 to 4. As will be readily understood, such taper (shown in somewhat exaggerated form in FIGS. 1 and 2 for purposes of illustration) better enables the coupling body member to receive, in fluid tight relation, pipe end portions which vary substantially in their diametral size. Moreover, as will hereinafter more fully appear, pipe couplings embodying the present invention can be used, without loss or diminution in their sealing effect, with pipe end portions which are slightly out of round and also whose outer surfaces are somewhat rough or irregular.

As best shown in FIGS. 2 and 3, the coupling body member 10 has telescopically mounted on each end thereof a resilient annular gasket 15 which may be of any suitable material, such as rubber, plastic and the like. Although said gaskets frictionally engage the ends of said coupling body member, they preferably are also adhesively secured thereon, with the consequent assurance of an effective seal therebetween. For their economical production, the gaskets 15 are preferably extruded in long lengths, cut to the desired coupling diametral size, and have their ends securely joined, as at 15a, FIG. 3, by vulcanization or the like, into annular form.

From FIGS. 2, 3 and 4, it will be noted that each gasket 15 includes (a) a circumferentially continuous outer flange 16 which surrounds and snugly engages the outer surface of one end portion of the coupling body member 10, (b) a circumferentially continuous inner flange 17 which projects axially inwardly into such end portion of said coupling body member, and (c) a transversely disposed annular portion 18 which connects the outer and inner flanges 16 and 17 and engages the end edge 19 of said coupling body member.

For sealing engagement with the pipe end portions 11 and 12 which, in use of the coupling, are axially inserted by pushing action into the coupling body member 10 and axially inwardly through the circumferentially continuous inner flanges 17 of the gaskets 15, the inner ends of said gasket flanges are integrally provided with enlarged resilient beads 20 of annular form and of any desired cross-sectional size and any desired cross-sectional shape. As here shown, the sealing beads 20 are of quite substantial cross-sectional size in comparison with the gasket, and also are of generally teardrop shape in cross section, with the beads being disposed radially inwardly of the flanges 17, as will be evident from FIGS. 2, 3 and 4. If desired and as here shown, the beads 20 may be provided with longitudinally extending ribs 21 which are transversely disposed relative to the coupling body member 10 and which, in their engagement with the pipe end portions 11 and 12, aid in the production of a particularly effective seal.

Preferably and as here shown (see FIG. 3), the gaskets 15 may be so formed that prior to the use of the coupling for the connection of two pipe end portions, the beaded ends of the inner flanges 17 are in slightly spaced relation to the inner surfaces of the coupling body member 10. This permits the beaded ends of such flanges to move radially outwardly upon insertion of the pipe end portions therethrough and thus aids in the use of the present coupling with pipe end portions which are slightly out of round and/or which have a slight taper. Moreover, of course, the resilient character of the beads 20 materially contributes to their effective sealing engagement with inserted pipe end portions regardless of the character of said pipe end portions, including irregularities in the outer surfaces thereof.

In the use of couplings embodying the present invention, the axially aligned end portions of the pipes to be connected are forcibly inserted into the end portions of the coupling body member 10 and through the resilient beads 20 of the inner gasket flanges 17, with the engagement of said flange beads and said inserted pipe end portions providing an effective fluid tight connection or liquid and gaseous seal therebetween. The engagement of the flange beads 20 and the inserted pipe end portions also provides the desired back-out resistance, not only during use of the coupling but in the installation of the pipe line, as will be readily understood. The teardrop shape of the beads 20 provides, of course, increased elongated sealing engagement of said beads with the pipe end portions, with said beads being firmly compressed by such engagement between the non-expandable coupling body member 10 and said pipe end portions 11 and 12, as best shown in FIG. 2. As will be readily understood, the connection of pipe end portions by couplings embodying the present invention may be readily effected in the field and by the use of unskilled labor, as simple endwise insertion of the plain end pipes into the present couplings is all that is necessary.

Although not essential, the body member 10 of the coupling constituting the embodiment of FIGS. 1 to 5 may be and here is integrally provided midway its ends with a radially extending annular flange 22 which is engaged by the inserted pipe end portions and which thus serves as a stop therefor. Proper centering of the coupling body member with respect to the inserted pipe end portions is thus assured, and as such flange stop does not extend inwardly beyond said pipe end portions, it does not interfere with the passage of fluids (liquids or gases) through such pipe end portions.

If desired, annular cap members 23, of plastic, metal or the like, may be provided for the external surfaces of the gaskets 15. As here shown, the cap members are of cup shape in cross section and are telescopically clamped onto the gaskets for maintaining the gaskets in assembly with the coupling body member 10. If desired, and if the pipe couplings are to be used in particularly high pressure lines, rivets 24 or the like may be used to secure said cap members and the gasket portions covered thereby to the end portions of the coupling body member 10, as in FIGS. 2 and 3. As will be readily understood, the cap members 23 add a finishing touch to the couplings, as well as affording protection therefor. Moreover, the covers 23 which are clamped over the gaskets 15 allow easy entry into the coupling body member of the pipe end portions to be connected thereby, as will be readily understood. Thus, the cap member has an inner portion which is in engagement with the flange 17 and retains the flange in engagement with the inner periphery of the body member 10. The inner portion of the cap member has an inner diameter which is greater than the outer diameter of the pipe but serves as a guide for the insertion of the pipe into the body member 10.

Although the gaskets 15 in the embodiment of the invention of FIGS. 1 to 4 are sleeved over or telescopically mounted on the ends of the coupling body member 10, couplings embodying the present invention may have their sealing gaskets arranged entirely within the end portions of the coupling body member.

In the embodiment of FIG. 5, a coupling body member 10a, identical with the coupling body member 10 of the previous embodiment, is provided with end gaskets 18a—of which only one is shown, which differ from the previous gaskets 15 only in that the gasket flanges 16a are reversely bent, within the coupling body member 10a, to overlie the gasket flanges 17a which are provided with the sealing beads 20a for fluid tight engagement with the pipe end portions, such as the pipe end portions 12a. For gasket reinforcement purposes, a generally rigid annular band 24, of metal, plastic or the like, is disposed between the gasket flanges 16a and 17a, and to prevent disassembly of the gaskets and the coupling body member, in the use of the coupling in a high pressure line or otherwise, the gasket flanges 16a and 17a and the reinforcing band therebetween are riveted at 25 or otherwise suitably secured to the coupling body member, as in FIG. 5.

As heretofore mentioned, the body member 10 of the coupling of FIGS. 1 to 4 is of longitudinally tapered form, to better accommodate pipe end portions which vary in their external diameters, say from ⅛ to ½ of an inch. However, couplings embodying the present invention may have body members which are of cylindrical form, such as the coupling body member 10b of FIG. 6. Due to the flexible nature of the inner gasket flanges and the resiliency of the annular beads thereof, minor variations in the pipe end portions can be readily taken care of, and thus for the connection of many pipe end portions, the coupling body members may be of simple cylindrical form. As other parts of the coupling of FIG. 6 are the same as those of the coupling of FIGS. 1 to 4, no further reference to the coupling of FIG. 6 is believed to be necessary.

To those skilled in the art to which the present invention relates, other features and advantages of pipe couplings embodying the present invention will be evident from the foregoing description of embodiments thereof.

Having thus described my invention, I claim:

1. A coupling for the connection in fluid tight relation of the axially aligned end portions of two pipes, said coupling comprising a tubular body member for the endwise reception of said pipe end portions, and gaskets sealingly mounted on the ends of said tubular body member, each of said gaskets being provided with a circumferentially continuous flexible flange in engagement with the inner periphery of said body member and extending axially into said tubular body member, said flange having an inner diameter substantially greater than the outer diameter of said pipe end portion and through which said pipe end portion extends in the connection thereof, said gasket flanges being provided at the inner ends thereof with resilient annular beads of transversely enlarged form for fluid type sealing engagement with said pipe end portion, the longitudinal plane of said flanges being offset radially outwardly of said beads, each of said gaskets being further provided with a circumferentially continuous outer flange surrounding and snugly engaging said tubular body member and an annular connecting portion integral with and extending between the outer ends of said inner and outer flanges, and means securing said gaskets to said body member, said securing means including annular cap members in engagement with each of said gaskets, said cap members having a first portion extending axially into said body member in engagement with the radially inner surface of said inner flange and having an inner diameter greater than the outer diameter of the pipe end portions, said cap member further including means for protecting said annular connecting portion of said gasket from engagement with a pipe being inserted in the body member.

References Cited

UNITED STATES PATENTS

| | | | |
|---|---|---|---|
| 600,961 | 3/1898 | Burnett | 277—166 X |
| 2,161,003 | 6/1939 | Berman | 277—205 X |
| 2,490,907 | 12/1949 | Kellaher et al. | 285—379 X |
| 2,546,096 | 3/1951 | Hauf | 285—379 X |
| 2,631,869 | 3/1953 | Warp | 285—5 |
| 2,635,907 | 4/1953 | Heimbuch | 277—205 X |
| 2,705,655 | 4/1955 | Brown et al. | 277—166 X |
| 2,932,321 | 4/1960 | Mercier | 285—110 X |
| 2,953,398 | 9/1960 | Haugen et al. | 277—207 |
| 3,081,102 | 3/1963 | Murray et al. | 277—207 |
| 3,171,675 | 3/1965 | Calciano | 285—110 |

FOREIGN PATENTS

| | | |
|---|---|---|
| 838,101 | 11/1938 | France. |
| 1,244,944 | 9/1960 | France. |
| 1,069,480 | 11/1959 | Germany. |
| 281,193 | 12/1964 | Netherlands. |
| 210,357 | 7/1960 | Austria. |

EDWARD C. ALLEN, *Primary Examiner.*

T. F. CALLAGHAN, *Assistant Examiner.*